US008331217B2

(12) United States Patent
Celebi et al.

(10) Patent No.: US 8,331,217 B2
(45) Date of Patent: *Dec. 11, 2012

(54) DITHERING SCHEME USING MULTIPLE ANTENNAS FOR OFDM SYSTEMS

(75) Inventors: Samel Celebi, Upper Montclair, NJ (US); Jie Song, Marlboro, NJ (US); Paul M. Yun, Bridgewater, NJ (US)

(73) Assignee: Agere Systems LLC, Wilmington, DE (US)

(*) Notice: Subject to any disclaimer, the term of this patent is extended or adjusted under 35 U.S.C. 154(b) by 890 days.

This patent is subject to a terminal disclaimer.

(21) Appl. No.: 12/412,607

(22) Filed: Mar. 27, 2009

(65) Prior Publication Data

US 2009/0180564 A1    Jul. 16, 2009

Related U.S. Application Data

(63) Continuation of application No. 10/229,673, filed on Aug. 28, 2002, now Pat. No. 7,529,177.

(51) Int. Cl.
*H04B 1/00* (2006.01)
*H04J 11/00* (2006.01)

(52) U.S. Cl. ........ 370/208; 370/260; 370/316; 370/334; 370/344; 370/503; 455/69; 455/129; 455/522; 455/561; 455/574; 375/130; 375/136; 375/222

(58) Field of Classification Search ................. 455/101, 455/129, 503, 561, 574; 370/208, 316, 319, 370/331, 334, 342, 344, 503
See application file for complete search history.

(56) References Cited

U.S. PATENT DOCUMENTS 5,191,576 A * 3/1993 Pommier et al. ............. 370/312
5,228,025 A * 7/1993 Le Floch et al. ............. 370/206
(Continued)

FOREIGN PATENT DOCUMENTS

EP    1 083 679 A1    3/2001
(Continued)

OTHER PUBLICATIONS

Japanese Office Action; Mailed Aug. 3, 2011 for corresponding JP Application No. 2003-303799.
(Continued)

*Primary Examiner* — Ayaz Sheikh
*Assistant Examiner* — Venkatesh Haliyur
(74) *Attorney, Agent, or Firm* — Mendelsohn, Drucker, & Associates, P.C.; Craig M. Brown; Steve Mendelsohn

(57) ABSTRACT

A ground- or roof-top-based repeater in an OFDM system uses multiple transmission antennas to transmit multiple identical OFDM signals. Dithering is performed by introducing a slight variable-frequency phase offset to all but one of the multiple identical transmitted OFDM signals. The effective overall channel is more dynamic and provides spatial diversity to minimize long periods of fading in fading subchannels of the OFDM signals when the receiver is in a slow moving or stationary situation. To overcome the additional cancellation problem that can occur when two or more of the transmitting antennas are (i) in a line-of-site position with the receiver and (ii) approximately the same distance from the receiver, a delay is deliberately introduced to make the delayed signals appear to be reflected signals. This delay will not negatively impact the OFDM receiver performance as long as the delay is within the guard interval used in the OFDM process.

14 Claims, 5 Drawing Sheets

U.S. PATENT DOCUMENTS

| | | | | |
|---|---|---|---|---|
| 5,289,499 | A | | 2/1994 | Weerackody ..................... 375/1 |
| 5,444,697 | A | | 8/1995 | Leung et al. ..................... 370/19 |
| 5,577,265 | A | | 11/1996 | Wheatley, III ............... 455/33.3 |
| 5,802,241 | A | * | 9/1998 | Oshima ......................... 386/328 |
| 5,914,933 | A | | 6/1999 | Cimini et al. ................. 370/208 |
| 5,943,372 | A | | 8/1999 | Gans et al. .................... 375/347 |
| 5,949,796 | A | * | 9/1999 | Kumar .......................... 370/529 |
| 6,128,276 | A | * | 10/2000 | Agee .............................. 370/208 |
| 6,130,859 | A | * | 10/2000 | Sonnenschein et al. ...... 367/134 |
| 6,157,612 | A | | 12/2000 | Weerackody et al. ......... 370/215 |
| 6,298,035 | B1 | | 10/2001 | Heiskala ....................... 370/206 |
| 6,359,923 | B1 | * | 3/2002 | Agee et al. .................... 375/130 |
| 6,377,631 | B1 | | 4/2002 | Raleigh ......................... 375/299 |
| 6,473,393 | B1 | | 10/2002 | Ariyavisitakul et al. ..... 370/203 |
| 6,686,879 | B2 | * | 2/2004 | Shattil .......................... 342/367 |
| 6,807,145 | B1 | | 10/2004 | Weerackody et al. ........ 370/203 |
| 6,813,485 | B2 | * | 11/2004 | Sorrells et al. ................ 455/313 |
| 6,842,487 | B1 | | 1/2005 | Larsson ........................ 375/260 |
| 7,010,048 | B1 | | 3/2006 | Shattil .......................... 375/259 |
| 7,068,628 | B2 | * | 6/2006 | Li et al. ........................ 370/334 |
| 7,149,239 | B2 | * | 12/2006 | Hudson ......................... 375/144 |
| 7,158,579 | B2 | * | 1/2007 | Hottinen ....................... 375/267 |
| 7,242,720 | B2 | * | 7/2007 | Sugiyama et al. ............ 375/260 |
| 7,248,841 | B2 | * | 7/2007 | Agee et al. .................... 455/101 |
| 7,251,460 | B2 | * | 7/2007 | Khatri ........................... 455/101 |
| 7,317,756 | B2 | * | 1/2008 | Lakkis .......................... 375/229 |
| 8,175,178 | B2 | * | 5/2012 | Moffatt et al. ................ 375/260 |
| 2002/0105928 | A1 | | 8/2002 | Kapoor et al. ................ 370/334 |
| 2002/0141508 | A1 | | 10/2002 | El-Gamal et al. ............ 375/267 |
| 2002/0172184 | A1 | | 11/2002 | Kim et al. ..................... 370/344 |
| 2002/0191535 | A1 | * | 12/2002 | Sugiyama et al. ............ 370/208 |
| 2002/0193146 | A1 | | 12/2002 | Wallace et al. ............... 455/562 |
| 2003/0117940 | A1 | * | 6/2003 | Smallcomb ................... 370/208 |
| 2004/0095907 | A1 | | 5/2004 | Agee et al. .................... 370/334 |
| 2004/0213351 | A1 | * | 10/2004 | Shattil .......................... 375/260 |
| 2012/0170680 | A1 | * | 7/2012 | Stern ............................. 375/299 |

FOREIGN PATENT DOCUMENTS

| | | |
|---|---|---|
| JP | 07-202855 | 8/1995 |
| JP | 11-186830 A | 7/1999 |
| JP | 2001-094506 A | 4/2001 |
| WO | WO 99/40648 | 8/1999 |
| WO | WO 02/25857 A1 | 3/2002 |

OTHER PUBLICATIONS

Moose, P. H., "A Technique for Orthogonal Frequency Division Multiplexing Frequency Offset Correction," IEEE Transactions on Communications, vol. 42, No. 10, 2908-2914 (Oct. 1994).

Pollet et al., "BER Sensitivity of OFDM Systems to Carrier Frequency Offset and Wiener Phase Noise," IEEE Transactions on Communications, vol. 43, No. 2/3/4, 191-193 (1995).

"Orthogonal Frequency Division Multiplexing (OFDM) Explained," www.magisnetworks.com/pdf/white_papers/ofdm.pdf (2001).

Bingham, J. A., "Multicarrier Modulation for Data Transmission: An Idea Whose Time Has Come," IEEE Communications Magazine, 5-14 (May 1990).

Edfors et al., "An Introduction to Orthogonal Frequency-Division Multiplexing," pp. 1-50 (Sep. 1996).

Non-Final Office Action; Mailed on Oct. 4, 2006 for corresponding U.S. Appl. No. 10/229,673, filed Aug. 28, 2002; 6 pages.

Non-Final Office Action; Mailed on Apr. 12, 2007 for corresponding U.S. Appl. No. 10/229,673, filed Aug. 28, 2002; 7 pages.

Final Office Acton; Mailed on Oct. 17, 2007 for corresponding U.S. Appl. No. 10/229,673, filed Aug. 28, 2002; 7 pages.

Non-Final Office Action; Mailed on Apr. 14, 2008 for corresponding U.S. Appl. No. 10/229,673, filed Aug. 28, 2002; 10 pages.

Final Office Action; Mailed on Oct. 28, 2008 for corresponding U.S. Appl. No. 10/229,673, filed Aug. 28, 2002; 13 pages.

Notice of Allowance and Fees Due; Mailed on Jan. 26, 2009 for corresponding U.S. Appl. No. 10/229,673, filed Aug. 28, 2002; 10 pages.

* cited by examiner

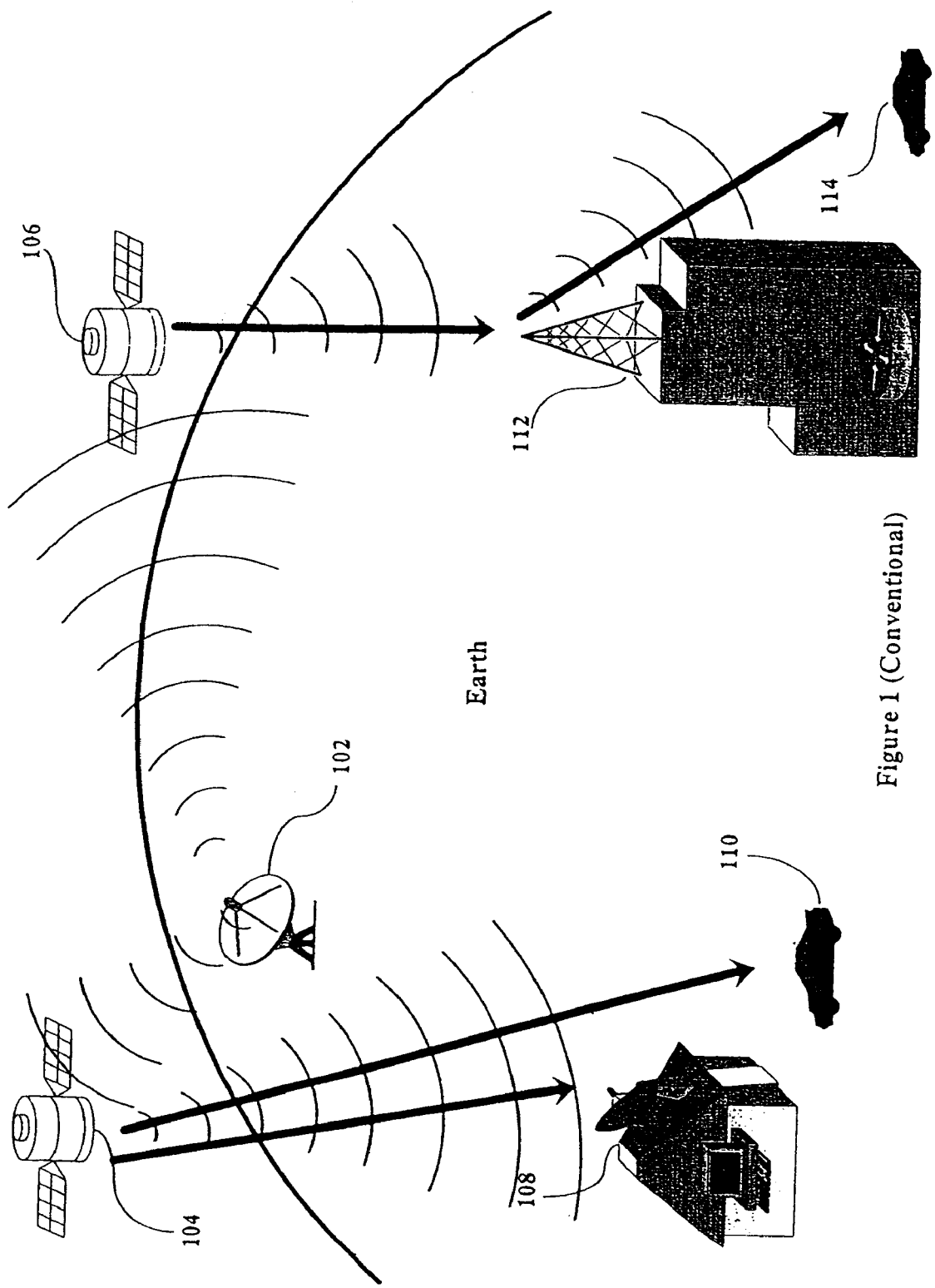
Figure 1 (Conventional)

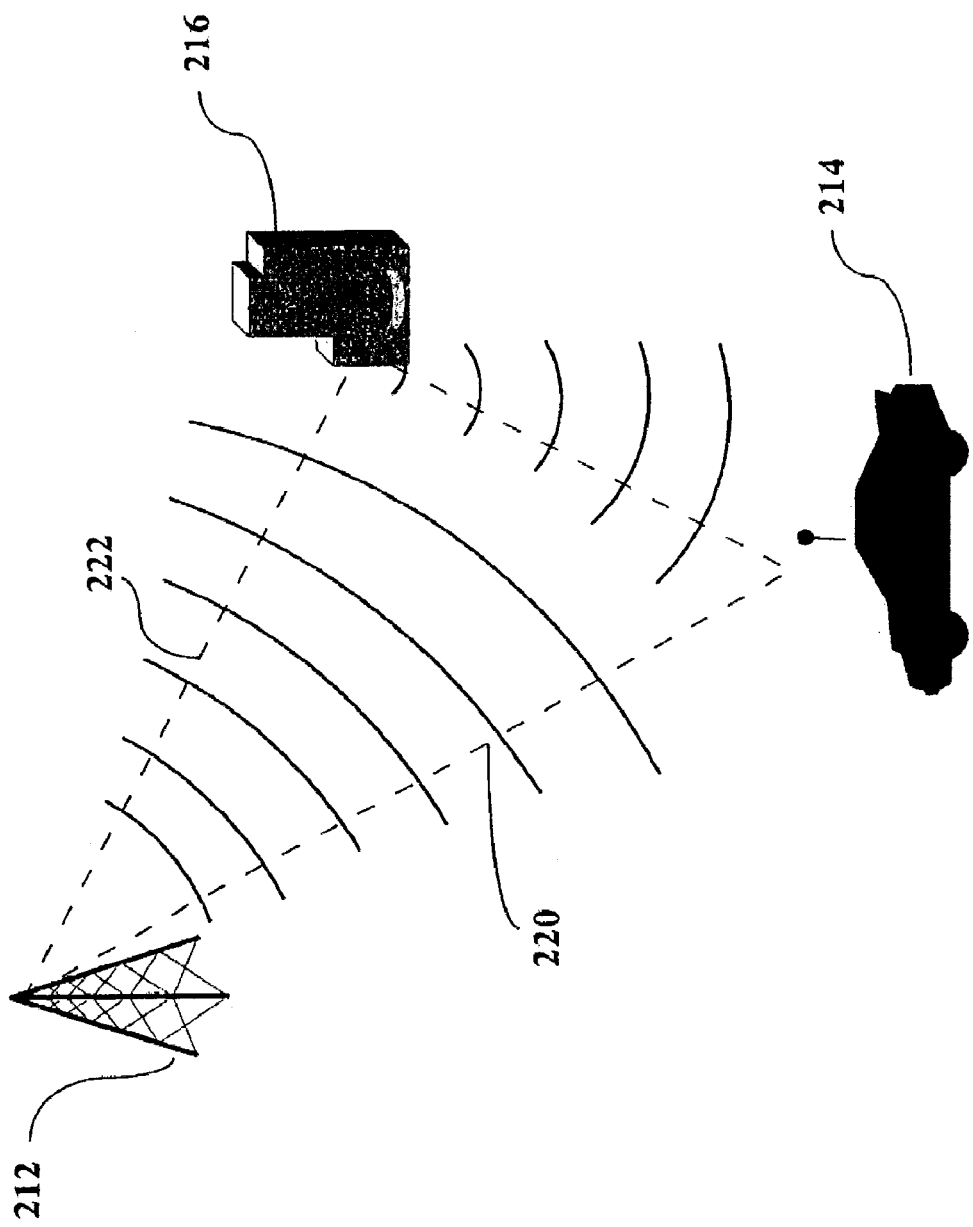
Figure 2 (Conventional)

DITHERING SCHEME USING MULTIPLE ANTENNAS FOR OFDM SYSTEMS

CROSS-REFERENCE TO RELATED APPLICATION

This application is a continuation of U.S. application Ser. No. 10/229,673, filed on Aug. 28, 2002 as the contents of all of which are incorporated herein by reference in their entireties.

FIELD OF THE INVENTION

This invention relates to wireless transmissions and, more particularly, to a method and system for improving the performance of satellite digital audio radio systems.

BACKGROUND OF THE INVENTION

Satellite radio is an emerging technology that is in the early stages of gaining consumer acceptance. Major electronics manufacturers such as Pioneer, Alpine, Carion, Delphi Delco, Sony, and Motorola and automobile companies, such as General Motors and Honda, are partnering with satellite radio providers to bring satellite radio to the consumer. Satellite radio enables users to subscribe to a service by which high quality audio content, free of the interference often accompanying traditional radio frequency (RF) broadcast systems, is available via satellite transmission. In addition, in vehicular use, satellite radio enables a vehicle equipped with the appropriate receiving equipment to hear the same station regardless of the vehicle location, i.e., a vehicle could travel from New York to Los Angeles without losing the signal of a particular station to which the receiving equipment is tuned.

Typically, a satellite radio service provider utilizes at least two satellites, although a single satellite or more than two satellites may be used, depending upon the amount of coverage area desired. A ground station transmits a signal containing the content to the two satellites, which reflect the signals back to earth where they can be received by radio receivers possessed by subscribers. The radio receivers are programmed to receive the signals and unscramble them so that the content of the transmission can be enjoyed by the listener. Various other information can be included in the broadcast signal, for example, information regarding the artist and title of a particular song being played, which can then be displayed on the receiver unit.

A major obstacle to achieving efficient and reliable data communications over traditional radio frequency channels in urban areas is multipath propagation, also called multipath fading. Multipath fading is the degradation, i.e., fading, of a radio signal that occurs when multiple copies of the same radio signal arrive at the receiver through different reflected paths. This can happen when, for example, there are signals reflected off of buildings, trees, other vehicles, etc. that arrive at the receiver at the same or different times. The interference of these signals, each having traveled a different distance, results in phase and amplitude constructive and/or destructive addition. This can result in severe and rapid fluctuations in the received signal strength, particularly with a mobile receiver as it is moved. The duration of a fade depends on the velocity of the receiver and is typically on the order of a few milliseconds.

The problem of multipath fading can be somewhat reduced through the use of repeaters. Typical satellite radio systems utilize one or more ground-based or roof-top-based repeaters in urban areas. The repeaters receive the signal from the satellites and re-transmit it on a more local basis to receivers in the urban area. While this decreases the problems caused by deflected signals, it does not eliminate the problem altogether and thus multipath fading and its associated problems persists.

In a conventional serial modulation scheme (also known as "single carrier" or "single channel" scheme), data bits are transmitted over a single channel sequentially. If a deep fade (a fading signal where the signal-to-noise ratio is very low) occurs during the transmission of such a signal, then the bits that are transmitted during the deep fade cannot be received correctly. To solve this problem, a technique known as "dithering" has been used, whereby the single carrier is transmitted using multiple antennas, and a different fixed-frequency phase offset is applied to each of the transmitted signals. By using this technique, each transmitted signal is effectively a different channel, each with independent multipath fading characteristics. In this way, the receiver receives multiple independent signals, not all of which are experiencing a deep fade, and performance is improved. Examples of dithering can be found in U.S. Pat. No. 6,157,612 to Weerackody et al; U.S. Pat. No. 5,289,499 to Weerackody; and U.S. Pat. No. 5,577,265 to Wheatley, III, each of which are incorporated fully herein by reference. The developments disclosed in each of these patents require the use of fixed-frequency phase offsets to provide the multiple independent copies of the transmitted signal.

Another known way to deal with multipath fading is to transmit a data frame containing a block of bits in parallel over a multichannel path at a low baud rate so that the time taken to transmit the frame is relatively long (typically, for example, on the order of a fraction of a second) relative to the expected duration of a fade. The effect of a fade is then spread out over many bits. Rather than a few adjacent bits being completely destroyed by a fade, all of the bits in the frame are slightly affected by a fade which occurs during the time that the frame is being transmitted.

One well-known and effective scheme for transmitting a block of bits in parallel over a channel is called orthogonal frequency-division multiplexing, or OFDM. OFDM is a wireless technology that operates on the principle of transmitting data by dividing the data stream into multiple, parallel bit streams that have a much lower bit rate and using these multiple bit-streams to modulate several low bandwidth sub-carriers or sub-channels. These sub-channels are orthogonal, which means every sub-channel can be separated out of the receiver without interference from the other sub-channels. This is made possible due to the mathematical property of orthogonal wave forms, which ensures that the integral of the product of any two sub-channels is zero. Therefore, by dividing up the frequency band into a large number of narrow-band sub-channels, wireless channel impairments, such as multipath fading, are significantly reduced. Fading impacts a very limited number of the sub-channels, and most of the narrow-band sub-channels, along with the information modulated into the wave form, are communicated over the channel in a reliable manner. Therefore, OFDM provides for superior link quality and robustness of communication over the wireless channel.

As mentioned above, OFDM is basically the dividing up of a single-channel transmission into multiple narrow-band sub-channels, prior to transmitting the group of sub-channels together over a single channel as a complete signal. When conditions are such that one or more of the sub-channels experiences a severe fading problem, problems still occur in the overall channel (the complete signal) when the sub-channels experiencing the fade contain information critical to the transmission, for example, synchronization information. When a vehicle with a satellite receiver experiences such a fade and is moving slowly or is stationary (i.e., so that it remains in a location subject to the fade for an extended time period), the information contained in this missing channel may disable the receiver's ability to process the incoming signal altogether. Accordingly, it would be desirable to have a method and system whereby the occurrence of deep fades in the sub-channels of an OFDM system can be minimized.

SUMMARY OF THE INVENTION

In accordance with the present invention, a ground- or roof-top-based repeater in an OFDM system uses multiple transmission antennas to retransmit the satellite signals. By using multiple transmission antennas, multiple identical OFDM signals are transmitted. Dithering is performed by introducing a slight variable-frequency phase offset to all but one of the multiple identical transmitted OFDM signals, and thus the effective overall channel is more dynamic and provides spatial diversity to minimize long periods of fading in fading subchannels of the OFDM signals when the receiver is in a slow moving or stationary situation. In accordance with an embodiment of the present invention, the variable-frequency phase offset is generated using the phase of the Rayleigh process.

This dithering process improves the bit-error rate of the fading sub-channel information without significantly affecting the overall OFDM demodulator performance when the vehicle is slow-moving or stationary. Introducing a variable-frequency phase offset at all but one of the multiple transmission antennas makes the overall channel response more dynamic i.e., the dithering increases the effective channel response between the repeater transmitting the signals and the receiver. A variable-frequency phase offset will provide a more random-like channel response, instead of a periodic channel response that results when a fixed-frequency offset is used.

To overcome the additional cancellation problem that can occur when two or more of the transmitting antennas are in a line-of-site position with the receiver and approximately the same distance from the receiver, a delay is deliberately introduced to make the delayed signal(s) appear to be reflected signals. This delay will not negatively impact the OFDM receiver performance as long as the delay is within the guard interval used in the OFDM process.

BRIEF DESCRIPTION OF THE DRAWINGS

FIG. 1 illustrates a conventional satellite radio system;

FIG. 2 illustrates the typical transmit/receive path of a signal being retransmitted from a repeater;

DETAILED DESCRIPTION OF THE PREFERRED EMBODIMENT

Figure 3:
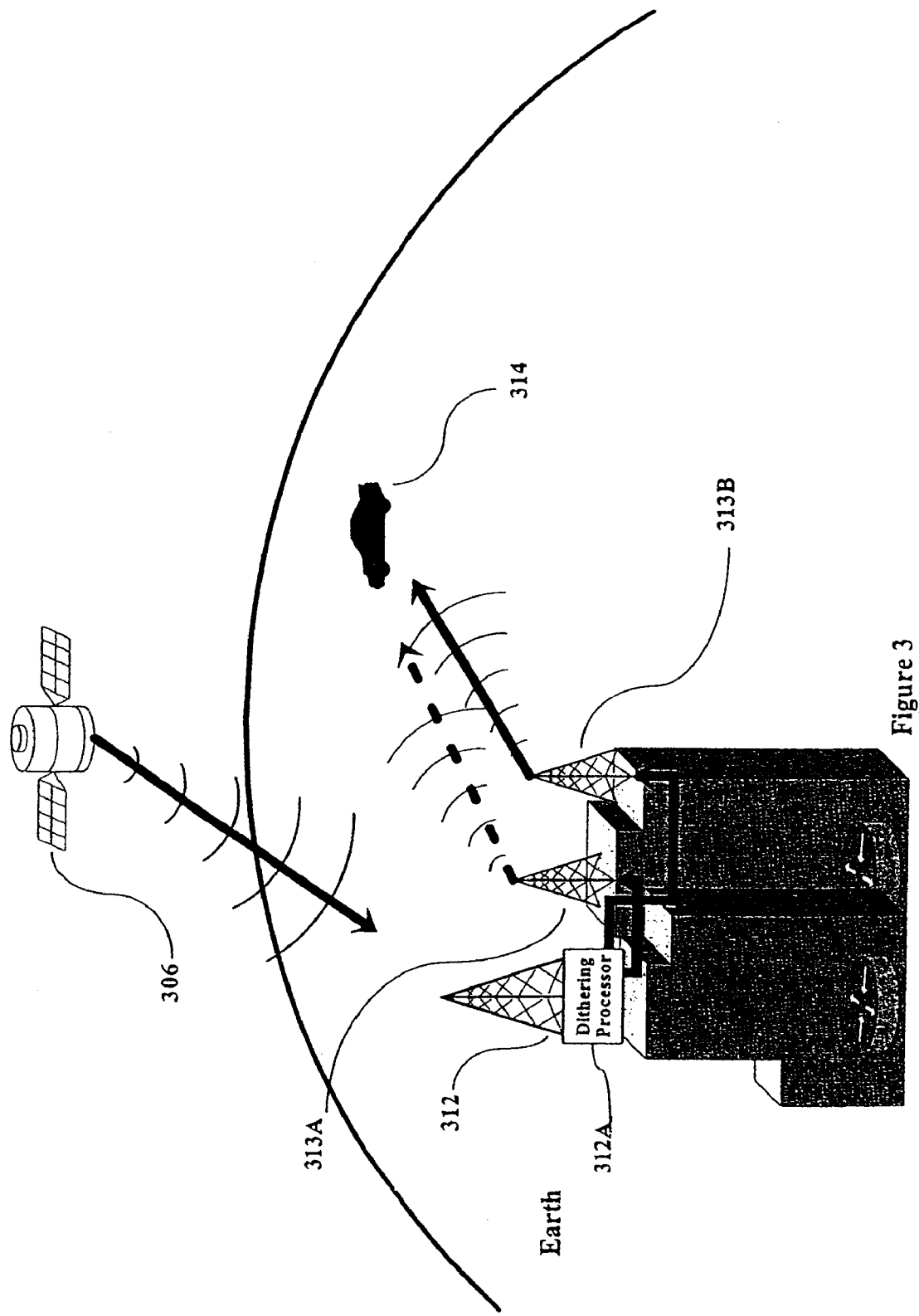
FIGS. 3 and 4 illustrate the transmit/receive path of a signal in accordance with the present invention.

FIG. 1 illustrates a conventional satellite radio system. An earth station 102 is utilized to broadcast content to satellites 104 and 106. In the example illustrated in FIG. 1, satellite 104 reflects the transmitted content back to earth to a wide area, including the vicinity of a residence 108 and a vehicle 110. Assuming that residence 108 and vehicle 110 are equipped with appropriate receiving equipment, each will receive the satellite transmission containing the content and be able to listen to the content being broadcast. Since residence 108 is stationary, the receiver in residence 108 will continue to receive the transmitted content as long as satellite 104 remains within range of residence 108.

Since vehicle 110 will typically be mobile and moving from one location to another, vehicle 110 will only receive the transmitted broadcast as long as it is within range of satellite 104 or another satellite in the system. However, even with a single satellite in the system, the broadcast range available using the satellite broadcast is significantly larger than the broadcast range available using a standard antenna-based system, and thus, vehicle 110 will receive the satellite signal over a wide coverage area.

In FIG. 1, residence 108 and vehicle 110 are located in a typical suburban area where impediments to the successful transmission of the content from the satellite to the receiver are minimal. However, as noted above, urban areas typically contain higher numbers of tall buildings and other structures that can impede the transmission. For example, vehicle 114 may be driving in a city where numerous tall buildings prevent the transmitted signal from reaching the receiver in the vehicle 114. Accordingly, for a typical satellite system serving an urban area, a repeater 112 comprising a processor, may be located on the ground or, as shown in FIG. 1, on the rooftop of a building in the city. Rooftop-based repeater 112 includes components that enable it to receive the signal from satellite 106 and retransmit the signal on a more local basis (and, typically, amplified to increase the transmission power) to receivers in the urban area, including to the receiver in vehicle 114. This allows receivers in the urban area to be able to take advantage of the wide range service available using satellite radio.

FIG. 2 illustrates the typical transmit/receive path of a signal being retransmitted from a repeater 212. As can be seen in FIG. 2, the first path 220 is a direct path from repeater 212 to vehicle 214. This direct path 220 is known as a line-of-site (LOS) transmission path. Since the repeater 212 is retransmitting the satellite broadcast in many different directions, it is common for reflected signals to also be received by the receiver in vehicle 214. Path 222 illustrates one such reflected signal. As can be seen in FIG. 2, the signal from repeater 212 reflects off of building 216 and received by the receiver situated in vehicle 214.

As noted above, multipath fading can occur when multiple copies of the same radio signal arrive at the receiver through different reflected paths, as illustrated in FIG. 2. As described above, OFDM may minimize the reception problems caused by multipath fading. However, when the receiver experiencing the multipath fading is moving slowly or is standing still (e.g., a vehicle sitting at the traffic lights), standard OFDM may still be insufficient because if one or more of the sub-channels is carrying information critical to the transmission (e.g., synchronization data) and that channel experiences a severe fade, then the overall signal may be still have problems.

Figure 4:
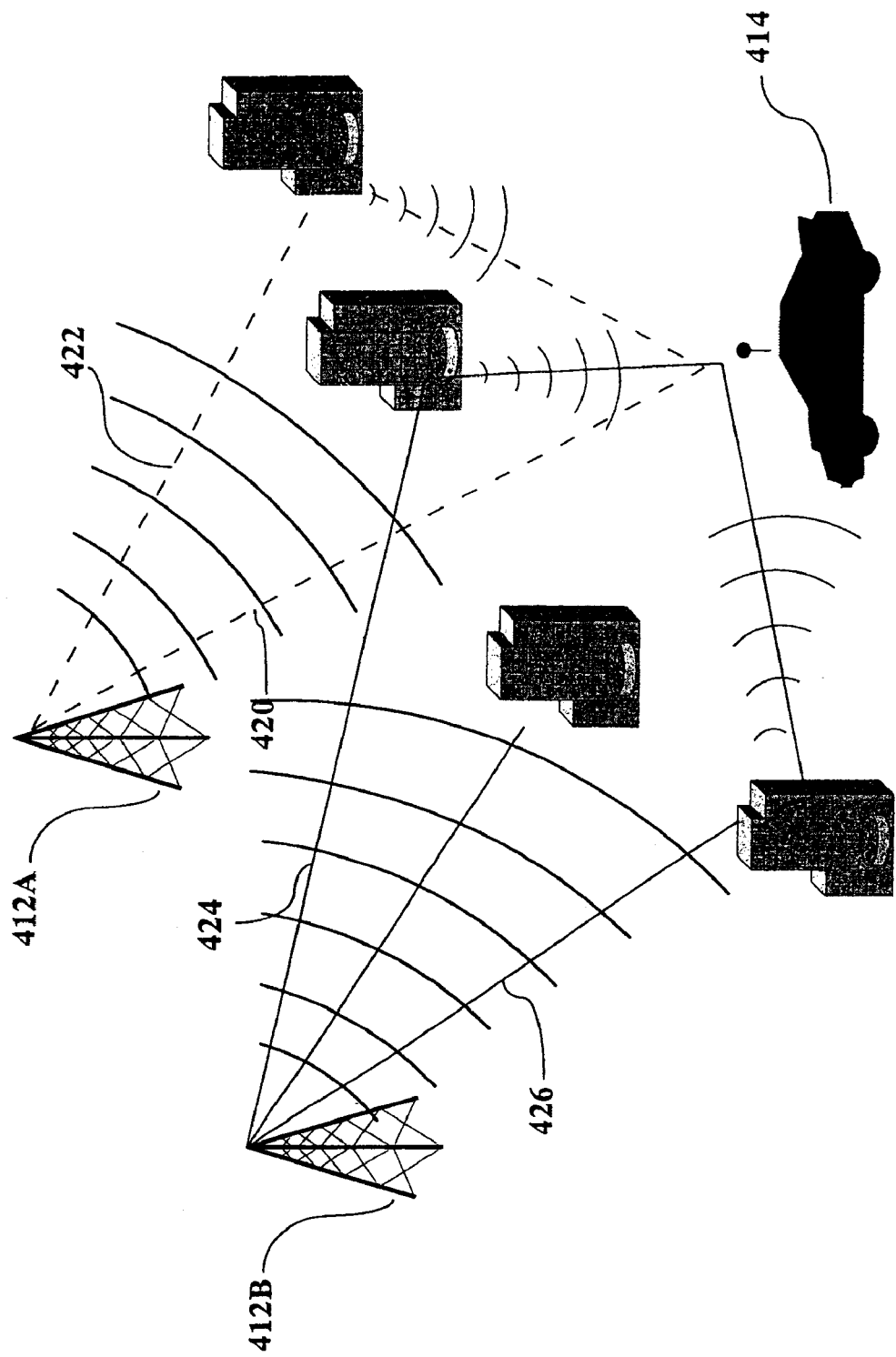

FIGS. 3 and 4 illustrate a transmit/receive path in accordance with the present invention and introduce the general concept of the present invention. In FIG. 3, a satellite 306 broadcasts the transmitted signal in the normal fashion. In accordance with the present invention, a repeater 312 receives the signals from satellite 306 and simultaneously rebroadcasts the transmitted signal locally using multiple transmit antennas 313A and 313B, with a slight variable-frequency-phase offset being introduced into one of the retransmitted signals, via a dithering processor 312A. Dithering processor 312A can comprise any known device for introduction of a variable-frequency phase offset, for example, a Rayleigh-process generator. In a preferred embodiment, the phase offset introduced is a phase of a Rayleigh process as described below.

Repeater 312 receives the transmitted signal from satellite 306, processes the signal through an amplifier/processor to boost the power of the signal in a conventional manner, and then transmits the amplified signal via first transmit antenna 313A for transmission to vehicle 314. Repeater 312 also introduces a variable-frequency phase offset to dither the signal transmitted over second transmission antenna 313B via dithering processor 312A. This makes the overall channel response between repeater 312 and the receiver of vehicle 314 more dynamic, increases the effective channel response between the repeater 312 transmitting the dual signals and the receiver. This dithering process improves the bit-error rate of any fading subchannel without significantly affecting the overall OFDM demodulator performance when the vehicle is slow moving or stationary.

FIG. 4 illustrates the transmit/receive paths of a signal being retransmitted from multiple transmit antennas 412A and 412B by a repeater such as repeater 312 of FIG. 3. As can be seen in FIG. 4, the first path 420 is a direct path from first transmit antenna 412A to vehicle 414 (i.e., path 420 is an LOS signal). A second path 422 reflects off a building and is redirected to vehicle 414. The second transmit antenna 412B transmits a third path 424 and a fourth path 426. In this example, neither of the paths 424 or 426 are LOS transmissions. Rather, each of these paths carry signals that are reflected off of buildings. The path between paths 424 and 426 would be a LOS transmission but for the building that lies directly in the line-of-sight between transmit antenna 412B and vehicle 414.

Figure 5:
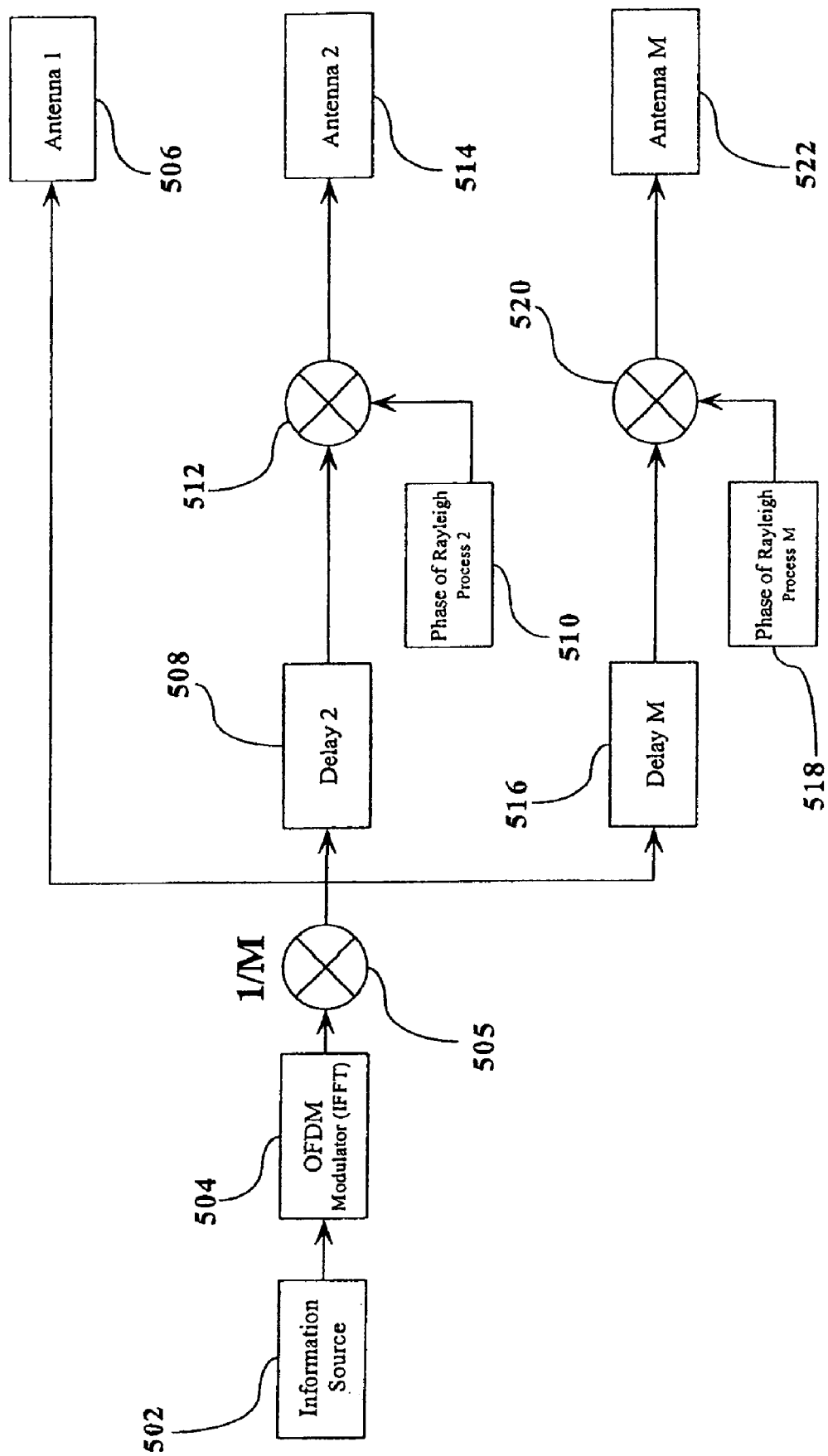
FIG. 5 is a functional block diagram illustrating the operation of the present invention.

FIG. 5 is a functional block diagram illustrating the operation of the present invention. Referring to FIG. 5, an information source 502 (e.g., the satellite 306) provides content information to a repeater (e.g. to receiving antenna 312 of FIG. 3). The information received by the receiving antenna 312 is input to an OFDM modulator 504. OFDM modulator 504 can comprise any known device for performing OFDM modulation.

OFDM modulator 504 divides the content information from the information source, using, for example, a serial to parallel buffer, to divide the incoming information into N groupings, with each group being B bits in length. OFDM modulator 504 then calculates the Inverse Fast Fourier Transform for each sub-channel to form a single composite channel comprising N subchannels (IFFT) of each group. In a well known manner, a guard interval is added so that the guard interval can mitigate the effects of the multipath-frequency selective-fading channels at the receiver. Finally, the subchannels, now processed as described, are parallel-to-serial converted to form a single time-domain signal for transmission.

In the example of FIG. 5, multiple antennas 506 (antenna 1), 514 (antenna 2), . . . , 522 (antenna M) are illustrated, with the variable "M" being a variable equal in number to the number of multiple antennas in the system. As shown in FIG. 5, the output of OFDM modulator 504 is first multiplied by a factor of 1/M (e.g., 505) to assure that the total transmit power remains constant, regardless of the number of antennas. The OFDM signal is then applied directly to antenna 506 for transmission to the receiving area. In accordance with the present invention, at step 508 a delay is introduced to the signal that will eventually be transmitted using antenna 514. In addition, the delayed signal is multiplied, via multiplier 512, by the phase of a Rayleigh process using any known technique and/or apparatus for generating the Rayleigh process. The signal so processed is then transmitted over antenna 514.

Each additional signal being transmitted (dependent upon the number of antennas being used in the system) is subjected to similar processing, i.e., signal M is delayed at step 516 and, at step 520, the delayed signal is multiplied by the phase of the Rayleigh process prior to transmission via antenna 522.

Optimally, the amount of delay introduced should be as small as possible, but must be larger than the delay introduced due to the displacement between antennas (typically approximately 10 times the wavelength of the transmitted signal).

As a result of performing this process, due to the use of the phase of the Rayleigh process to provide a variable frequency phase offset (or other known means for introducing a variable frequency phase offset), the effective overall channel is more dynamic and provides spatial diversity to minimize long periods of fading when the receiver is in a slow moving or a stationary situation. In addition, to deal with the situation whereby the simultaneous receipt of two or more LOS transmission signals from the multiple antennas by the receiver causes the simultaneous signals to cancel each other out, the delay provided prior to transmission will cause the LOS signals to be received at slightly different time instances, thereby allowing the guard interval to treat the multiple LOS transmission signals as though they were multipath signals. In other words, the receiver "perceives" the LOS signals as though they were two (or more) instances of the same signal coming from the same antenna (and arriving at different times due to reflections) rather than two (or more) of the same signal arriving from different antennas. Thus, the multipath fading problem resulting from such signals can be reduced using the guard interval, even though the signals are generated from different antennas.

Although the present invention has been described with respect to a specific preferred embodiment thereof, various changes and modifications maybe suggested to one skilled in the art and it is intended that the present invention encompass such changes and modifications as fall within the scope of the appended claims.

The invention claimed is:

1. A method for transmitting an information stream over a wireless communication medium to one or more receivers, the method comprising:
   (a) applying both orthogonal-frequency division multiplexed (OFDM) modulation and splitting to the information stream to generate a first copy and M−1 other copies of an OFDM signal;
   (b) applying M−1 variable-frequency phase offsets to the M−1 other copies to generate M−1 phase-offset copies; and
   (c) transmitting the first copy and the M−1 phase-offset copies via M respective antennas over the wireless communication medium, where M is an integer value greater than 1.

2. The invention of claim 1, wherein the M−1 variable-frequency phase offsets are applied in step (b) by multiplying each of the M−1 other copies by a phase generated by a Rayleigh process.

3. The invention of claim 1, wherein the OFDM modulation is applied to the information stream before the splitting.

4. The invention of claim 3, wherein the OFDM signal is multiplied by 1/M after the OFDM modulation and prior to the splitting.

5. The invention of claim 1, wherein:
   step (b) comprises applying M−1 delays and the M−1 variable-frequency phase offsets to the M−1 other copies of the OFDM signal to generate M−1 delayed, phase-offset copies, wherein the M−1 delays are relative to the first copy; and the M−1 phase-offset copies transmitted in step (c) are the M−1 delayed, phase-offset copies.

6. The invention of claim 5, wherein the M−1 delays are applied prior to the M−1 variable-frequency phase offsets.

7. The invention of claim 1, wherein the application of the M−1 variable-frequency phase offsets increases effective channel response between the M antennas and the one or more receivers.

8. An apparatus for transmitting an information stream over a wireless communication medium to one or more receivers, the apparatus comprising:

both an orthogonal-frequency division multiplexing (OFDM) modulator and a splitter adapted to apply OFDM modulation and splitting, respectively, to the information stream to generate a first copy and M−1 other copies of an OFDM signal;

a first multiplier adapted to apply M−1 variable-frequency phase offsets to the M−1 other copies to generate M−1 phase-offset copies; and a transmission device adapted to transmit the first copy and the M−1 phase-offset copies via M respective antennas over the wireless communication medium.

9. The invention of claim 8, wherein the first multiplier applies the M−1 variable-frequency phase offsets step (b) by multiplying each of the M−1 copies by a phase generated by a Rayleigh process.

10. The invention of claim 8, wherein OFDM modulation is applied by the OFDM modulator before splitting is applied by the splitter.

11. The invention of claim 10, further comprising a second multiplier adapted to multiply the OFDM signal by 1/M before the OFDM signal is split.

12. The invention of claim 8, wherein:

the apparatus comprises a delay buffer and the first multiplier adapted to apply M−1 delays and the M−1 variable-frequency phase offsets, respectively, to the M−1 other copies of the OFDM signal to generate M−1 delayed, phase-offset copies, wherein the M−1 delays are relative to the first copy; and the M−1 phase-offset copies transmitted by the transmission device are the M−1 delayed, phase-offset copies.

13. The invention of claim 12, wherein the M−1 delays are applied by the delay buffer before the variable-frequency phase offsets are applied by the first multiplier.

14. The invention of claim 8, wherein the application of the M−1 variable-frequency phase offsets increases effective channel response between the M antennas and the one or more receivers.

* * * * *